UNITED STATES PATENT OFFICE.

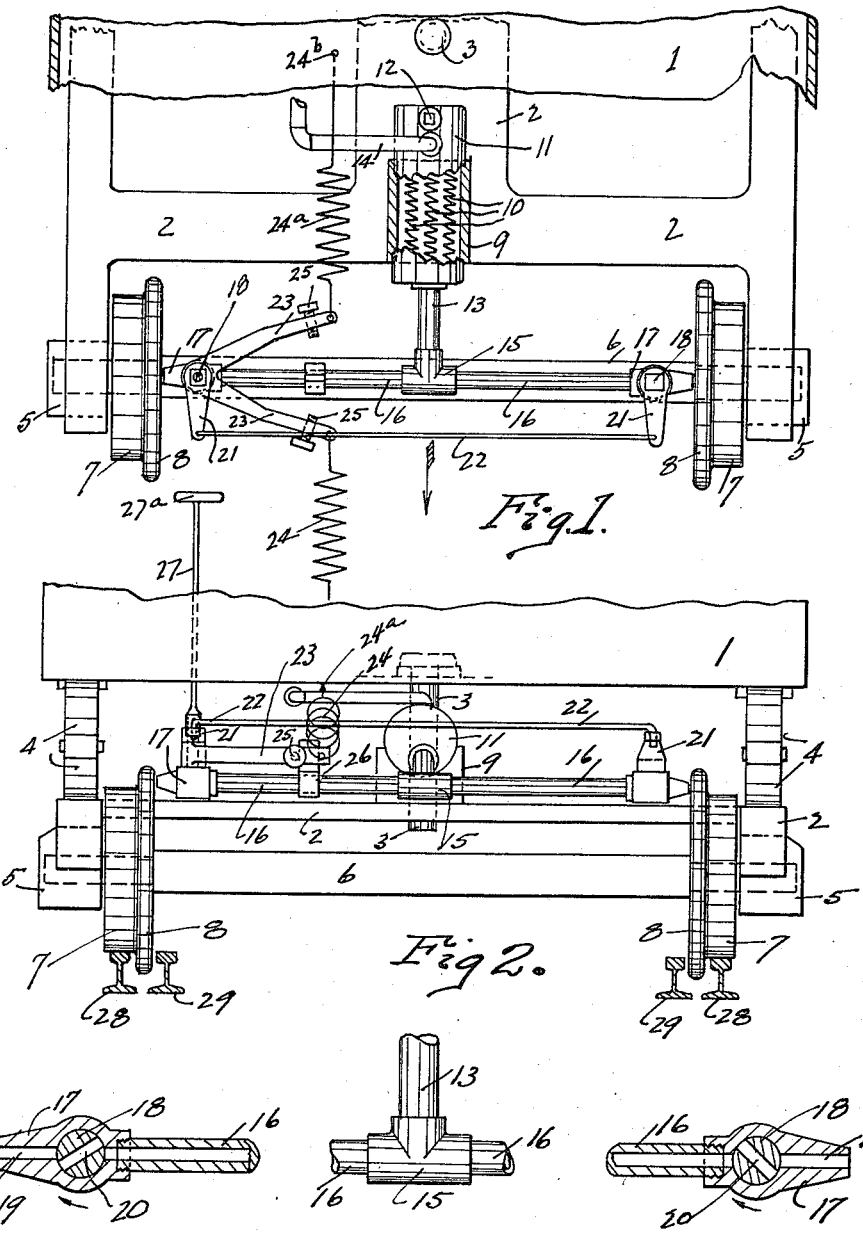

HENRY A. BOUK AND JOHN F. LEISE, OF SEATTLE, WASHINGTON.

OILING DEVICE.

1,149,020.  Specification of Letters Patent.  Patented Aug. 3, 1915.

Application filed June 8, 1914. Serial No. 843,870.

*To all whom it may concern:*

Be it known that we, HENRY A. BOUK and JOHN F. LEISE, both citizens of the United States, and residents of Seattle, in the county of King and State of Washington, have invented certain new and useful Improvements in Oiling Devices, of which the following is a specification.

This invention relates to oiling devices and has for its principal object to provide means for oiling the flanges of car wheels at any desired time without the necessity of stopping the car, the said means being operated automatically, and also capable of being manually operated when occasion requires.

A further object is to provide means for supplying oil to the flanges under pressure and means for heating the oil to any desired temperature, all of said means being easily attachable to an ordinary street car.

We attain these objects by the mechanism illustrated in the accompanying drawings, described in the following specifications and pointed out in the appended claims.

In the drawings, Figure 1 is a plan view of our device shown attached to the truck of a car, parts of the truck being omitted and only a fragment of the car shown. Fig. 2 is a front elevation of the same showing a fragment of the car, rails and guard rails. Fig. 3 is a fragmentary enlarged detail front elevation, partly in section, of the pipe member and its directly associated parts.

Referring now more particularly to the drawings, reference numeral 1 designates the car; 2, its truck frame, which is attached to the car by a king pin 3 and springs 4, the said truck having journal bearings 5 to receive the journals of the axles 6 upon which wheels, 7, are mounted, the said wheels having flanges 8. Attached to the truck frame 2, by any suitable means, is a heater 9 having resistance coils 10 therein, the said coils being supplied with electricity from any suitable source carried by the car. Attached to, and resting upon, the heater 9 is a tank 11 which is shown broken away in Fig. 1 in order to show the coils 10 and heater 9. The said tank has a filling plug 12, outlet connections 13 and air inlet connections 14, and the air may be supplied under pressure from the usual compressor carried by the car, the air passing through the connection 14 to the surface of the oil in the tank 11, thus creating a pressure within the tank. To the connection 13 a T 15 is attached to which are attached pipes 16 the outer ends of which terminate in valves 17 which are shown as of the cock type having plugs 18; the said valves and plugs are provided with suitable openings 19 and 20 respectively. Attached to the tops of the plugs 18 are levers 21 which connect the said plugs in tandem by means of a rod 22. Similarly attached to one of the plugs 18 is a V-shaped lever 23, to the outer end of which are attached springs 24 and 24ª, the opposite ends of the said springs being attached to the car as shown at 24ᵇ. Through the legs of the said V-shaped lever adjusting screws 25 pass, there being a stop 26 attached to the pipes 16 and against which the said adjusting screws are adapted to strike, the purpose of the said adjusting screws and stop being to regulate the maximum desired opening of the valve, as will be readily understood. Attached to the plug 18 of one of the valves 17 is a hand wrench 27 which terminates in a handle 27ª. In Fig. 2 the wheels 7 are shown resting on the rails 28, and guard rails 29 such as are common on curves, crossings, etc., are also shown.

The operation of our device will be more fully explained as follows:—Suppose the car and its attached trucks to be moving in the direction of the arrow in Fig. 1, and to be turning on a curve to the left as seen in that figure, it will be readily understood that the front truck will rotate clockwise a certain amount, depending upon the degree of curvature about the king pin 3. This rotation and the tendency of the car and truck to continue in a straight line tangent to the curve will cause the flanges 8 of the wheels 7 on the left-hand side of the truck to rub against the guard rail, 29, causing friction and wear on the said flanges and guard rails. The above mentioned rotation of the truck about the king pin will tend to lessen the tension on the spring 24ª and to increase the tension on the spring 24. This unbalancing of the tension on the springs 24 and 24ª will cause the lever 23 to rotate clockwise, thereby turning the valve plug to which it is attached in the direction of the arrow in Fig. 3, thus bringing the opening 20 into alinement with the opening 19 and the pipe 16, which allows the oil to pass out through the said opening and against the flanges of the wheels. The same motion is given to the other valve plugs by means of the connecting lever 21 and rod 22, but the said plug being set at a different angle with respect to its opening 19, it will be further closed by rotating clockwise, as will readily be seen by reference to Fig. 3. When the curve has been passed the action of the truck, in turning to its original position, will cause said springs to rotate the plugs to their normal position again. It will be evident, though, that when the car moves around a curve to the right the plugs will rotate counter-clockwise thus opening the valve on the right side of the truck as seen in the drawings, and thereby oiling the flanges on the right-hand wheels. It is evident that either valve may be opened at any desired time by manually operating the hand wrench 27.

It is obvious that many changes in the details of construction of our device will readily occur to others skilled in the art without departing from the spirit and scope of my invention and I therefore desire to avoid being limited to the exact details of construction shown and described except as pointed out in the appended claims.

Having described our device, what we claim as new and desire to protect by Letters Patent is—

1. In an oiling device for car tracks, the combination with a car adapted to run upon a track, of an oil container secured to the car, outlets in the said container adjacent to the inner faces of the flanges upon the wheels of the car, a valve for each of the said outlets and means controlled by the movement of the body of the car with respect to its truck which automatically opens one outlet and closes the other, said means including a V-shaped lever which is held between balancing springs and a rod which connects the said valves in tandem.

2. In an oiling device for car tracks, the combination with a car adapted to run upon a track, of an oil container secured to the car, outlets in the said container adjacent to the inner faces of the flanges upon the car wheels, a valve for each of the said outlets, and means controlled by the movement of the body of the car with respect to its truck which automatically opens one of the said outlets and closes the other, the said means including a V-shaped lever which is held between balancing springs and a rod which connects the said valves in tandem, means for connecting the said oil container with the usual air compressor upon the car, and means for heating the oil within the said container.

HENRY A. BOUK.
JOHN F. LEISE.

Witnesses:
FRED P. GORIN,
EMMA KROGER.

Copies of this patent may be obtained for five cents each, by addressing the "Commissioner of Patents. Washington, D. C."